US 6,597,142 B2

(12) United States Patent
Shibukawa et al.

(10) Patent No.: US 6,597,142 B2
(45) Date of Patent: Jul. 22, 2003

(54) APPARATUS AND METHOD FOR SETTING CONTROL PARAMETERS OF MACHINING APPARATUS

(75) Inventors: Tetsuro Shibukawa, Nagoya (JP); Akimitsu Kamiya, Okazaki (JP); Kazunari Ogura, Tsushima (JP); Atsuhisa Asada, Obu (JP); Tadashi Otani, Anjo (JP); Shinji Murakami, Toyota (JP); Katsuhiro Maseki, Toyoake (JP); Yoshihiko Yamada, Kasugai (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/956,832

(22) Filed: Sep. 21, 2001

(65) Prior Publication Data

US 2002/0084763 A1 Jul. 4, 2002

(30) Foreign Application Priority Data

Sep. 29, 2000 (JP) .......................................... 2000-301296
Oct. 12, 2000 (JP) .......................................... 2000-311514

(51) Int. Cl.⁷ .............................................. G05B 19/18
(52) U.S. Cl. .................... 318/569; 318/567; 318/568.1; 318/594; 318/570; 318/590; 318/600; 700/160; 700/172; 700/175; 700/180; 700/184; 700/187
(58) Field of Search ............................... 318/567, 568.1, 318/569, 570, 590, 594, 600; 700/160, 170, 172, 175, 176, 179, 180, 184, 186, 187

(56) References Cited

U.S. PATENT DOCUMENTS

| 4,521,860 | A |   | 6/1985 | Kanematsu et al. ......... 364/474 |
| 4,591,968 | A |   | 5/1986 | Nozawa et al. ............. 364/167 |
| 4,604,705 | A | * | 8/1986 | Imanishi ..................... 364/474 |
| 4,723,207 | A | * | 2/1988 | Isobe et al. ................. 364/171 |
| 4,992,948 | A |   | 2/1991 | Pilland et al. ......... 364/474.15 |
| 5,249,135 | A |   | 9/1993 | Fujita .................... 364/474.21 |
| 5,400,260 | A | * | 3/1995 | Matsumura et al. ... 364/474.22 |
| 5,550,744 | A | * | 8/1996 | Steinbichler ........... 364/476.01 |
| 5,751,589 | A |   | 5/1998 | Sato et al. ............. 364/474.35 |
| 6,112,133 | A | * | 8/2000 | Fishman ..................... 700/182 |
| 6,389,325 | B1 | * | 5/2002 | Rutkowski .................. 700/180 |

* cited by examiner

*Primary Examiner*—Bentsu Ro
*Assistant Examiner*—Rina I. Duda
(74) *Attorney, Agent, or Firm*—Oblon, Spivak, McClelland, Maier & Neustadt, P.C.

(57) ABSTRACT

An apparatus for setting control parameters of a machining apparatus. The setting apparatus includes a storage unit for storing a set of control parameters for each of a plurality of machining modes; an input device for selecting one of the plurality of machining modes; and a control unit for selecting a set of control parameters corresponding the selected machining mode and setting the set of control parameters as control parameters to be used for controlling the machining apparatus.

9 Claims, 8 Drawing Sheets

| NO. | LOCUS | FEATURES |
|---|---|---|
| COMMAND PATH | A: SHAPE HAVING SMALL RADIUS OF CURVATURE (a1, a2); B: SHAPE HAVING LARGE RADIUS OF CURVATURE (b1, b2); C: SHARP ANGULAR CORNER (c1, c2); D: GENTLE ANGULAR CORNER (d1) | — |
| ① | ------ COMMAND PATH; ——— ACTUAL PATH. MACHINING. At A, B: VIBRATION DUE TO MECHANICAL SHOCK IS SMALL. At C, D. VIBRATION DUE TO MECHANICAL SHOCK IS PERMISSIBLE, IMPORTANT IS PLACED ON EFFICIENCY. | MODE IN WHICH IMPORTANCE IS PLACED ON MACHINING TIME |
| ② | ------ COMMAND PATH; ——— ACTUAL PATH. MACHINING. VIBRATION DUE TO MECHANICAL SHOCK IS SMALL at A, C, D. VIBRATION DUE TO MECHANICAL SHOCK IS PERMISSIBLE, IMPORTANT IS PLACED ON EFFICIENCY. | MODE IN WHICH IMPORTANCE IS PLACED ON MACHINING TIME OF CORNER PORTION |
| ③ | ------ COMMAND PATH; ——— ACTUAL PATH. MACHINING. VIBRATION DUE TO MECHANICAL SHOCK IS SMALL at B, C, D. VIBRATION DUE TO MECHANICAL SHOCK IS PERMISSIBLE, IMPORTANT IS PLACED ON EFFICIENCY. | MODE IN WHICH IMPORTANCE IS PLACED ON MACHINING TIME OF CURVED PORTION |

FIG. 4

| NO. | LOCUS | FEATURES |
|---|---|---|
| ④ | ---- COMMAND PATH  ―― ACTUAL PATH<br>VIBRATION DUE TO MECHANICAL SHOCK IS SMALL<br>MACHINING — A, B, C, D<br>INFLUENCE OF MECHANICAL VIBRATION APPEARS ONLY AT PORTIONS WHERE ACCELERATION AND VARIATION IN ACCELERATION ARE HIGH | STANDARD MODE |
| ⑤ | ---- COMMAND PATH  ―― ACTUAL PATH<br>VIBRATION DUE TO MECHANICAL SHOCK IS SMALL<br>MACHINING — A, B, C, D<br>INFLUENCE OF MECHANICAL VIBRATION DOES NOT APPEAR EVEN AT PORTIONS WHERE ACCELERATION AND VARIATION IN ACCELERATION ARE HIGHER THAN THOSE AT CURVED PORTIONS A AND B | MODE IN WHICH IMPORTANCE IS PLACED ON ACCURACY OF CURVED PORTION |
| ⑥ | ---- COMMAND PATH  ―― ACTUAL PATH<br>VIBRATION DUE TO MECHANICAL SHOCK IS SMALL<br>MACHINING — A, B, C, D<br>INFLUENCE OF MECHANICAL VIBRATION DOES NOT APPEAR EVEN AT PORTIONS WHERE ACCELERATION AND VARIATION IN ACCELERATION ARE HIGHER THAN THOSE AT CORNER PORTIONS C AND D | MODE IN WHICH IMPORTANCE IS PLACED ON ACCURACY OF CORNER PORTION |
| ⑦ | ---- COMMAND PATH  ―― ACTUAL PATH<br>MACHINING — A, B, C, D<br>INFLUENCE OF MECHANICAL VIBRATION DOES NOT APPEAR EVEN AT PORTIONS WHERE ACCELERATION AND VARIATION IN ACCELERATION ARE VERY HIGH | MODE IN WHICH IMPORTANCE IS PLACED ON ACCURACY |

```
G100   A
G01    X500.00, Y200.00    F1000
              .
              .
              .
              .
```
PROGRAM FOR ROUGH MACHINING STEP

```
G100   A
G01    X500.00, Y200.00    F1000
              .
              .
              .
              .
```
PROGRAM FOR INTERMEDIATE-FINISH MACHINING STEP

```
G102   C
              .
              .
              .
              .

G102   D
              .
              .
              .
              .
```
PROGRAM FOR FINISH MACHINING STEP

- A: MEMORY ADDRESS OF CONTROL PARAMETERS FOR ROUGH MACHINING STEP
- B: MEMORY ADDRESS OF CONTROL PARAMETERS FOR INTERMEDIATE-FINISH MACHINING STEP
- C: MEMORY ADDRESS OF CONTROL PARAMETERS FOR FINISH MACHINING STEP A
- D: MEMORY ADDRESS OF CONTROL PARAMETERS FOR FINISH MACHINING STEP B

APPARATUS AND METHOD FOR SETTING CONTROL PARAMETERS OF MACHINING APPARATUS

INCORPORATION BY REFERENCE

The disclosure of Japanese Patent Application Nos. 2000-301296 filed on Sep. 29, 2000 and 2000-311514 filed on Oct. 12, 2000 including the specification, drawings and abstract are incorporated herein by reference in its entirety.

BACKGROUND OF THE INVENTION

1. Field of the Invention

The present invention relates to an apparatus and method for setting control parameters of a machining apparatus such as a machine tool.

2. Description of the Related Art

When a workpiece is machined by use of a machine tool equipped with a computerized numerical controller (CNC) (hereinafter referred to as an "NC machine tool"), control characteristics (e.g., machining time, machining accuracy) vary depending on control parameters of the NC machine tool. Desired control characteristics may vary among users, and may also vary among workpieces of different types which a single user machines by use of a single NC machine tool. Therefore, NC machine tools are configured to enable users to set (or modify) control parameters.

Conventionally, when control parameters of an NC machine tool are to be set or modified, a worker causes the NC machine tool to display a control-parameter setting screen on a display unit of an operation unit of the NC machine tool, and subsequently inputs various control parameters individually on the control-parameter setting screen by use of an input device.

Control parameters are used for adjusting a CNC in accordance with the characteristics and functions of an NC machine tool and motors for operating the NC machine tool. Therefore, values of the control parameters do not directly correspond to the desired machining accuracy and shape of a workpiece. Therefore, when the above-described method of directly inputting various control parameters to thereby set or modify the control parameters is used, the worker encounters difficulty in determining proper values for control parameters which enable attainment of desired control characteristics, with the result that the worker encounters difficulty in setting optimal values for the control parameters. In particular, in an NC machine tool having a plurality of drive axes, since machining is effected through combined movements of the plurality of drive axes, the work for setting the control parameters becomes more difficult. As described above, when the conventional method for setting control parameters is employed, a worker encounters difficulty in setting control parameters.

SUMMARY OF THE INVENTION

In view of the foregoing, an object of the present invention is to provide an apparatus and method for setting control parameters of a machining apparatus, which method and apparatus enable easy setting of control parameters for obtaining desired control characteristics.

In the following description, the term "control parameters" may refer to actual values set for control parameters.

In order to achieve the above object, the present invention provides an apparatus for setting control parameters of a machining apparatus, comprising: a storage unit for storing a set of control parameters for each of a plurality of machining modes; an input device for selecting one of the plurality of machining modes; and a control unit for selecting a set of control parameters corresponding the selected machining mode and setting the set of control parameters as control parameters to be used for controlling the machining apparatus.

Since a set of control parameters is stored in a storage unit for each of a plurality of machining modes, a set of control parameters required for attaining desired control characteristics can be set through a simple operation of selecting a machining mode, without direct setting of control parameters. Therefore, setting of control parameters can be facilitated.

Preferably, the control-parameter setting apparatus includes a display unit; and the control unit displays the plurality of machining modes on the display unit. When one of the plurality of machining modes displayed on the display unit is selected by use of the input device, the control unit selects a set of control parameters corresponding to the selected machining mode and sets the set of control parameters as control parameters to be used for controlling the machining apparatus.

In this case, since the plurality of machining modes are displayed on a display unit, selection of a machining mode is facilitated.

Preferably, the plurality of machining modes are classified in accordance with either or both of machining accuracy and machining time. Preferably, the plurality of machining modes are classified in accordance with corner accuracy and curve accuracy. In this case, since the plurality of machining modes are classified in accordance with machining conditions which a worker can understand easily, the worker can set control parameters on the basis of desired machining conditions.

Preferably, the plurality of machining modes are displayed on the display unit in the form of a graph. In this case, since the plurality of machining modes are displayed in the form of a graph, selection of a machining mode is facilitated further.

The present invention also provides a method for setting control parameters of a machining apparatus, comprising the steps of: storing in a storing unit a set of control parameters for each of a plurality of machining modes; designating one of the plurality of machining modes; and selecting a set of control parameters corresponding to the designated machining mode and setting the set of control parameters as control parameters to be used for controlling the machining apparatus.

Since a set of control parameters is stored in a storage unit for each of a plurality of machining modes, a set of control parameters required for attaining desired control characteristics can be set through a simple operation of, for example, inserting machining mode information into a machining program, without direct setting of control parameters. Therefore, setting of control parameters can be facilitated.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Figure 1:
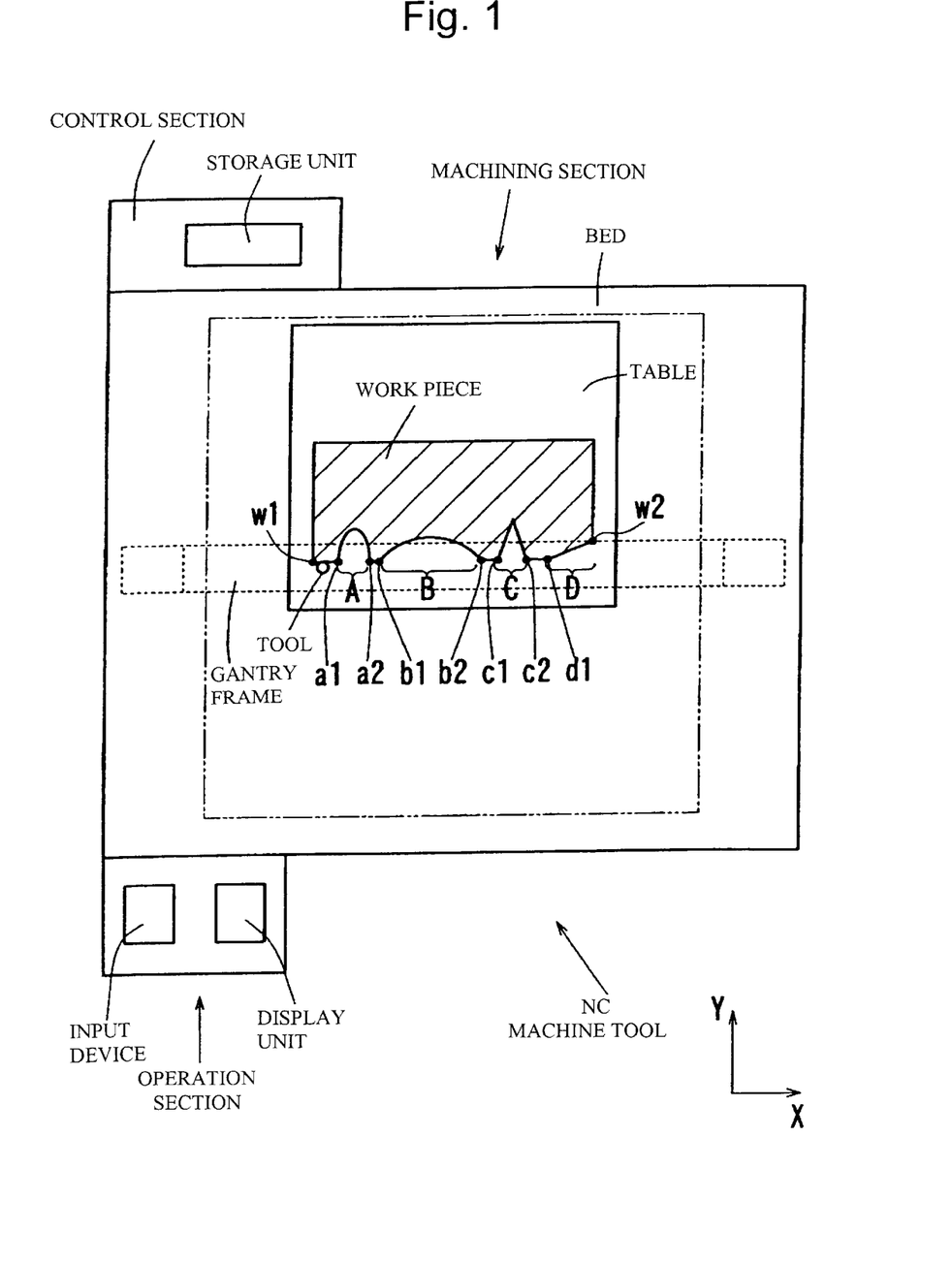
FIG. 1 is a plan view showing an example machining apparatus.

An embodiment of the present invention will be described with reference to FIGS. 1 to 8. The present embodiment exemplifies the case in which a workpiece W is contoured by an NC machine tool 1 equipped with a CNC having three numeral control axes (NC axes). FIG. 1 is a plan view (top view) of the NC machine tool 1 in which the workpiece W is placed on a table 8. In the NC machine tool 1, the table 8 is moved along an X-axis direction (right/left direction in FIG. 1) and a Y-axis direction (top/bottom direction in FIG. 1); and a tool 10 is moved along a Z-axis direction (direction perpendicular to the sheet of FIG. 1).

The NC machine tool 1 consists of a machining section 2 for machining the workpiece W, an operation section 3 for operating the NC machine tool 1, and a control section 4 for controlling the movements of the table 8 and the tool 10 of the NC machine tool 1.

The machining section 2 includes a bed 7, the above-described table 8 for supporting the workpiece W, and the above-described tool 10 for machining the workpiece W. Unillustrated X-axis and Y-axis servomotors for moving the table 8 along the X-axis and Y-axis-directions, respectively, are attached to the bed 7. An unillustrated encoder is attached to each of the X-axis and Y-axis servomotors in order to detect the position of the table 8. Thus, the table 8 can be moved and stopped within an area surrounded by a two-dot chain line shown in FIG. 1.

The tool 10 is rotatably supported by an unillustrated spindle head, which is supported by a gantry frame 9 mounted on the bed 7 in such a manner that the spindle head is movable along the Z-axis direction. An unillustrated Z-axis servomotor for moving the spindle head along the Z-axis direction is provided on the gantry frame 9, and an unillustrated encoder is attached to the Z-axis servomotor in order to detect the Z-axis position of the tool 10. The contour of the workpiece W is machined by means of movement of the table 8 along the X-axis and Y-axis directions and movement of the tool 10 along the Z-axis direction accompanied by rotation about the Z-axis.

The operation section 3 includes an input device 5 for inputting a machining program, machining data, a control program, etc., and a display unit 6 for displaying various data. Through operation of the input device 5, a worker can designate a control-parameter setting mode, and can move the table 8 and the tool 1. Further, the worker can cause the control section 4 to display on the display unit 6 a machining-program creating/editing screen, a control-parameter setting screen, or any other screen.

The control section 4 includes a CNC capable of two-axis simultaneous control. The CNC includes a CNC board, a servo control board, and a sequence control board, which are accommodated in a control cabinet. A central processing unit (CPU) is provided on the CNC board. The X-axis, Y-axis, and Z-axis servomotors are controlled by the CNC board and the servo control board.

Further, the control section 4 includes a storage unit 11 for storing a machining program, a control program, control parameters, etc. The storage unit 11 stores a set of control parameters for each of machining modes, which will be described later.

In the NC machine tool 1, the workpiece W is machined by means of combined movements of the table 8 and the tool 10 driven by the plurality of drive motors. Therefore, the worker encounters difficulty in setting control parameters to values which enable obtainment of desired control characteristics, through direct input of set values for the control-parameters. In view of this, the method and apparatus according to the present invention do not request a worker to input values for the control parameters. In the present invention, each of a plurality of sets of control characteristics is represented in the form of a machining mode, which the worker can understand with ease; and for each machining mode a set of control parameters is stored in the storage unit.

Figure 2:
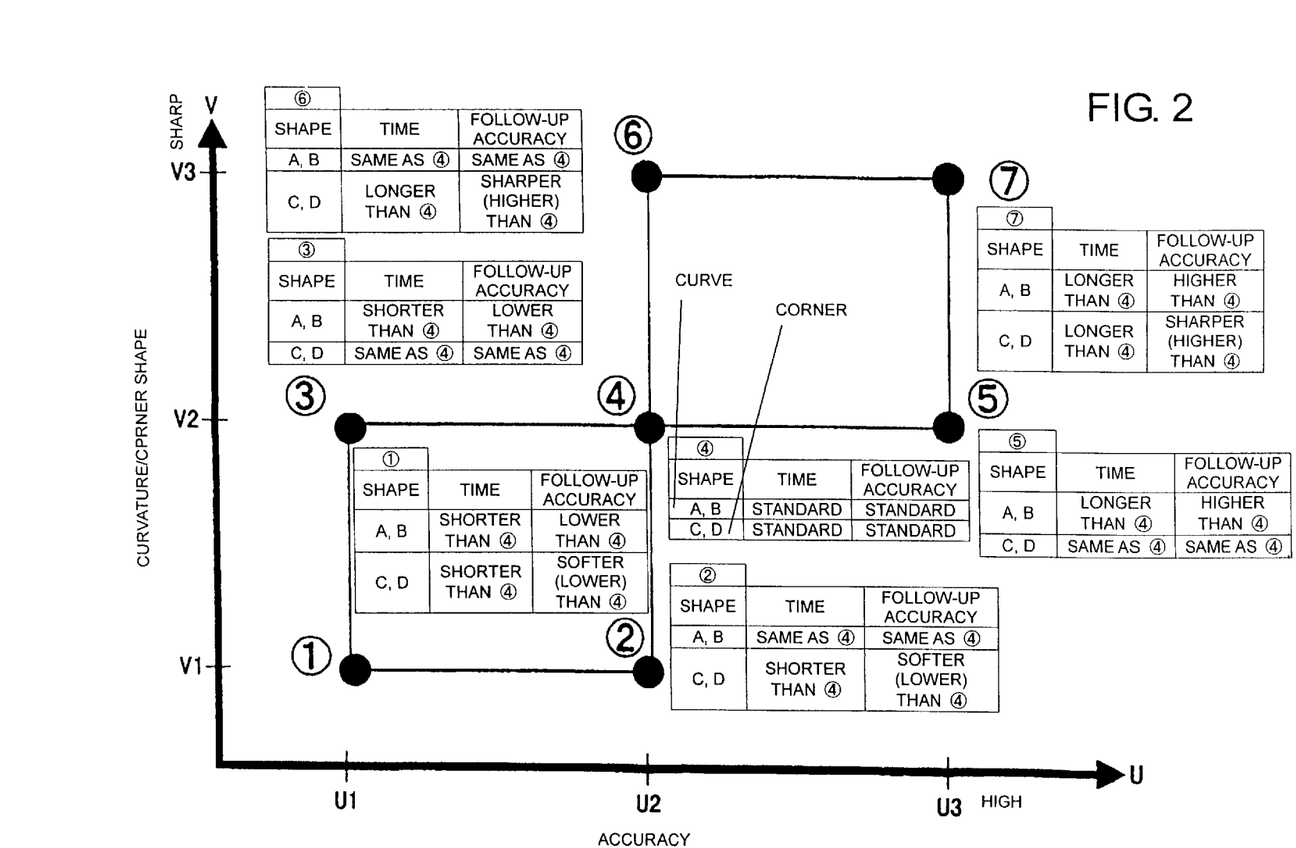
FIG. 2 is a diagram showing a machining mode graph.
Figure 3:
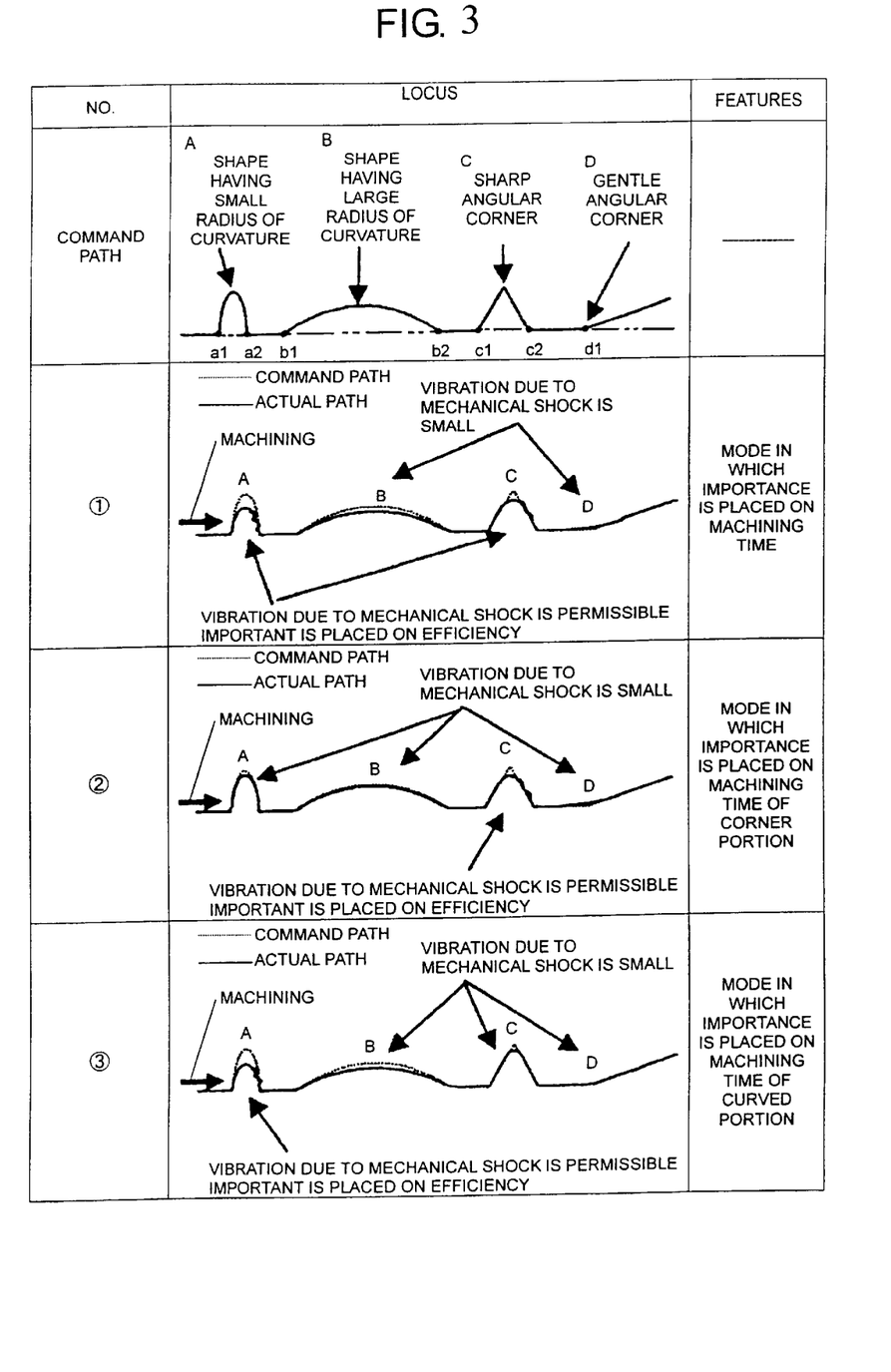
FIGS. 3 and 4 are tables each showing a commanded machining path and an actual machining path for each machining mode.
Figure 4:
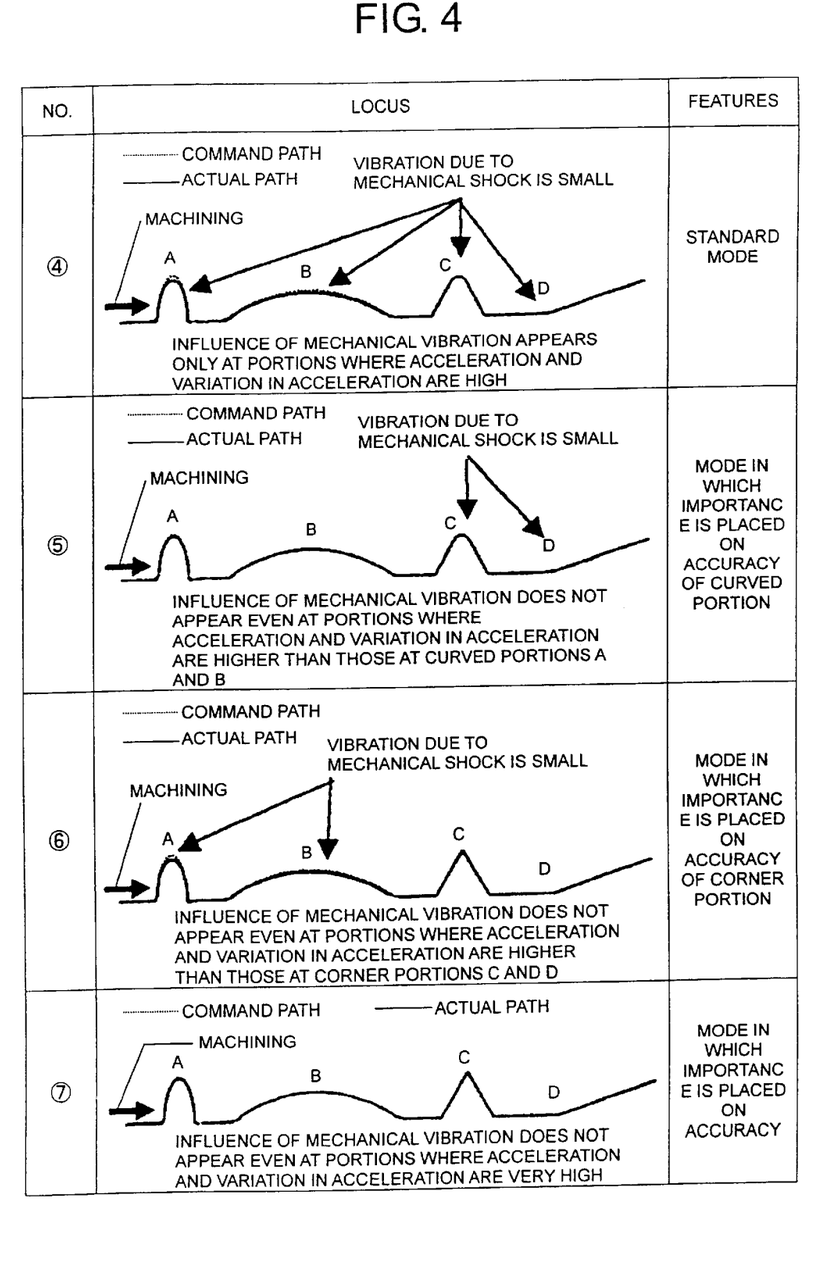
Figure 5:
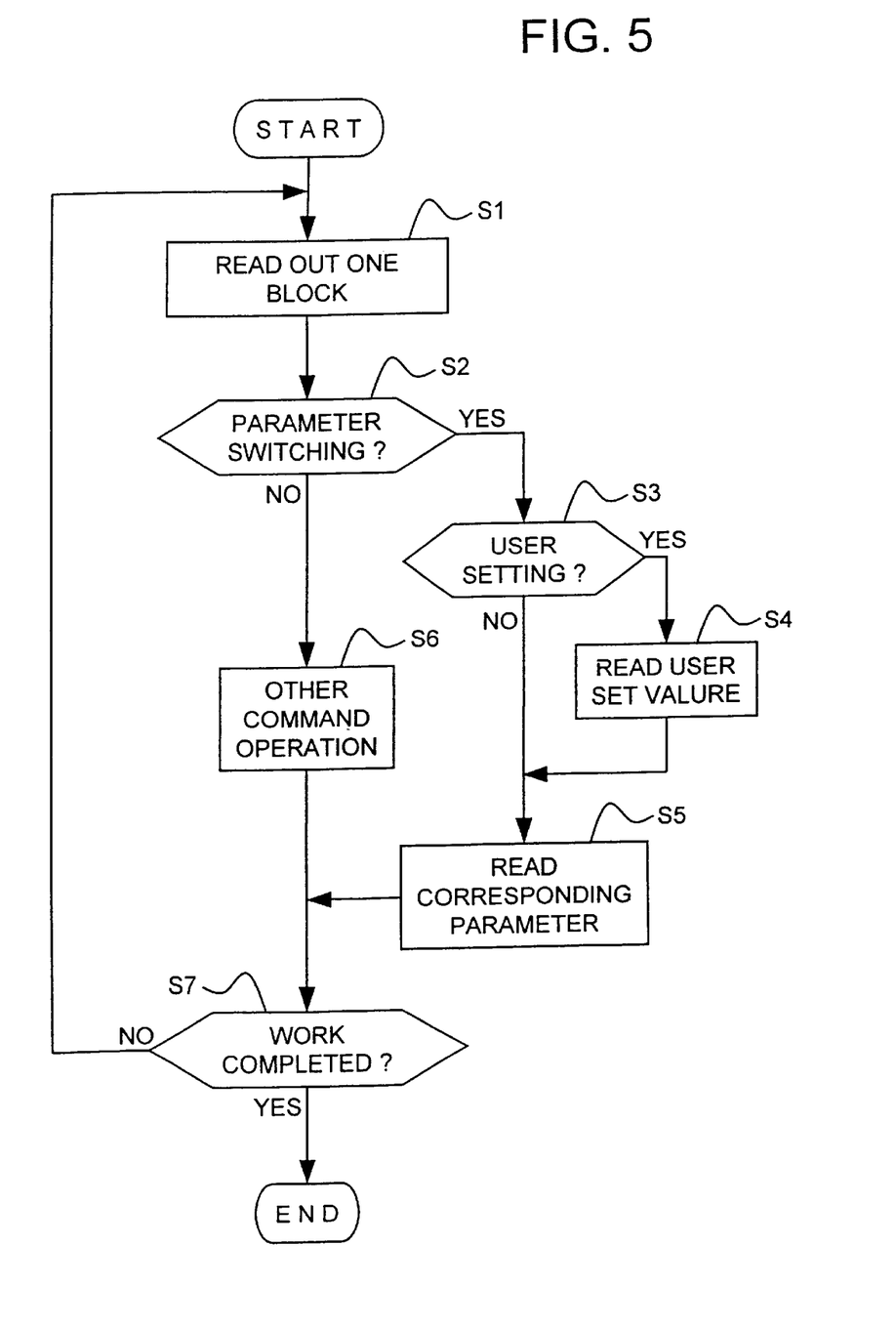
FIG. 5 is a flowchart showing an operation for machining a workpiece while using control parameters, which are set by a method according to an embodiment of the present embodiment.
Figure 6:
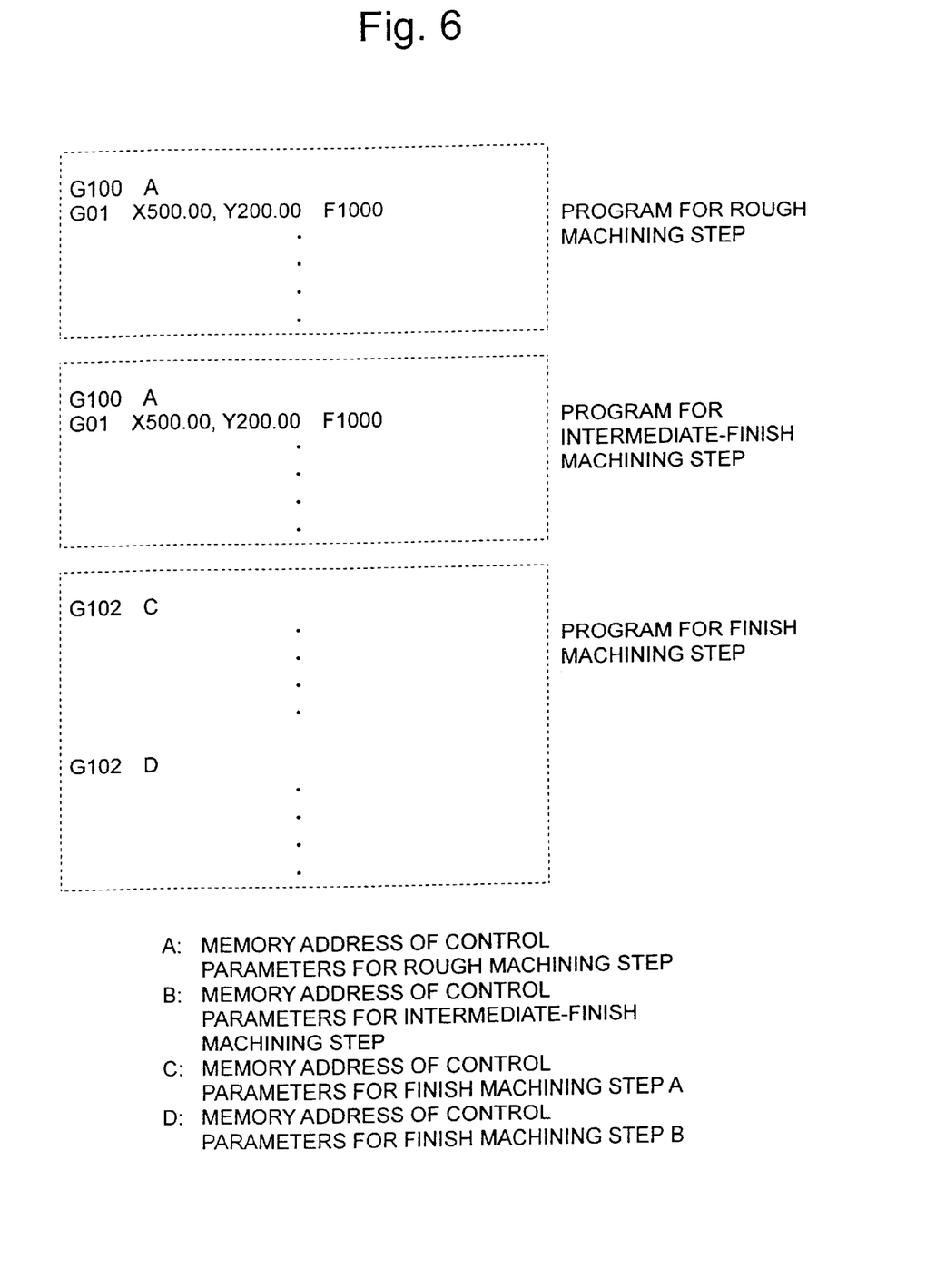
FIG. 6 is a diagram showing an example machining program used in the embodiment.
Figure 7:
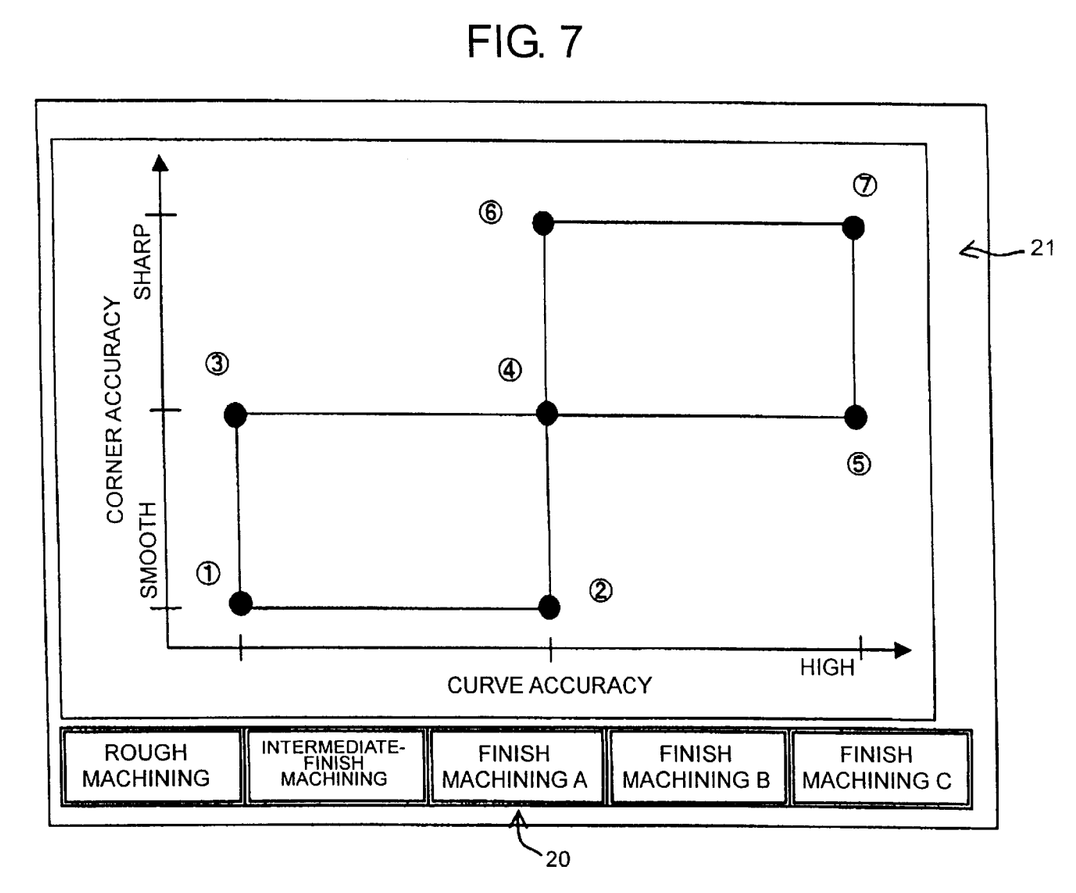
FIG. 7 is a diagram showing an example control-parameter setting screen used in the embodiment.
Figure 8:
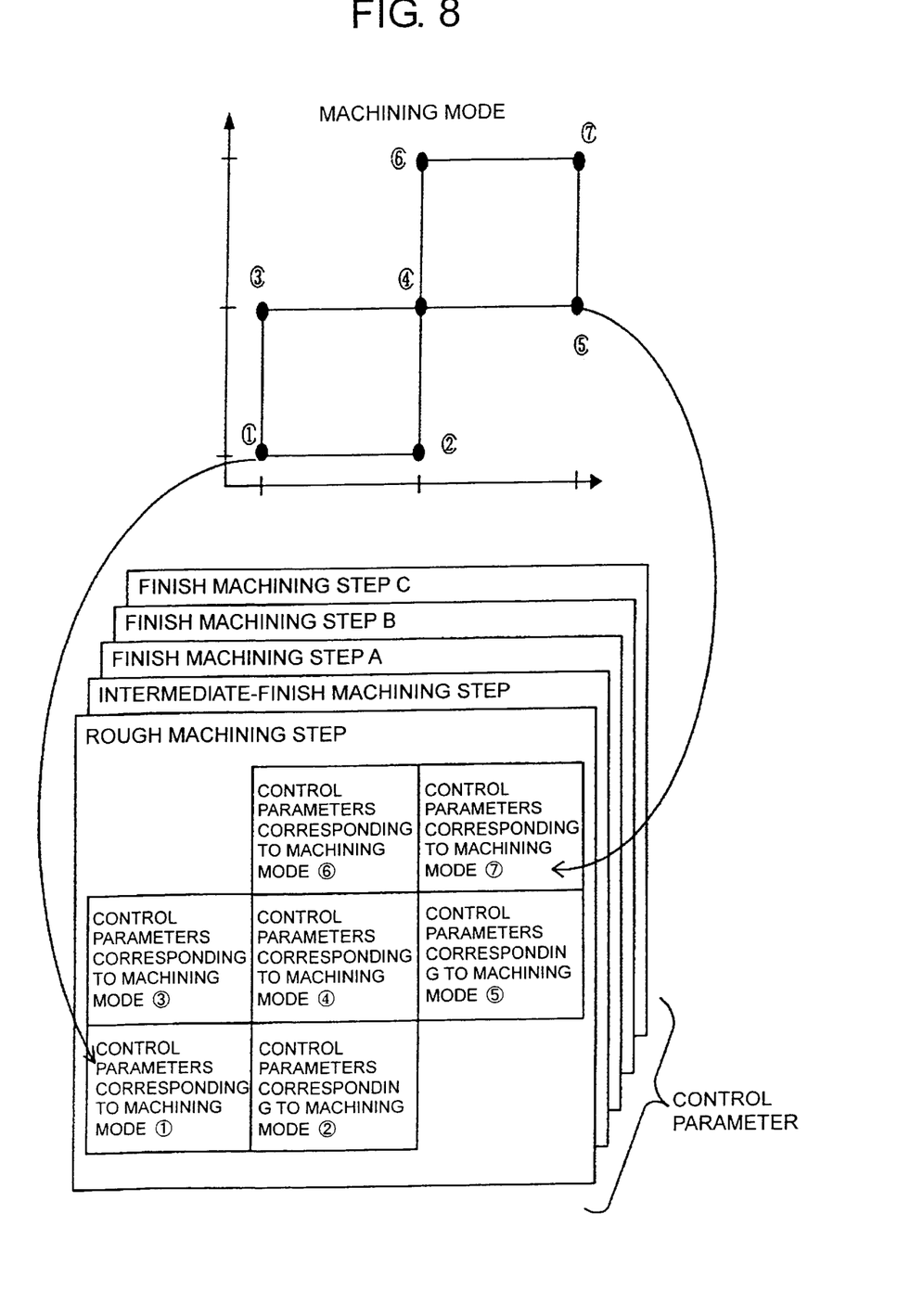
FIG. 8 is an explanatory diagram showing the relationship between machining steps and machining mode graphs stored in a storage unit in the embodiment.

FIG. 2 shows a diagram in which machining modes selectable for machining the workpiece W are displayed in the form of a machining mode graph. FIGS. 3 and 4 are tables showing changes in machining status (control characteristics) when a contour of the workpiece W shown in FIG. 1, starting from end point w1 and ending at end point w2, is machined in each of seven machining modes. FIG. 5 is a flowchart showing an operation of the control section 4 for machining the workpiece W while using control parameters set by the method of the present embodiment. FIG. 6 is a diagram showing an example machining program used in the embodiment. FIG. 7 is a diagram showing an example control-parameter setting screen. FIG. 8 is an explanatory diagram showing the relationship between machining steps and machining mode graphs stored in the storage unit 11.

In the present embodiment, seven machining modes are provided. The machining modes are used so as to represent control characteristics by machining conditions, such as corner accuracy, curve accuracy, machining accuracy, machining shape, and machining time, which the worker understands with ease. A set of control parameters corresponding to each machining mode is stored in advance in the storage unit 11 as a control-parameter database. Examples of the control parameters include "corner speed difference," "allowable acceleration," "acceleration/deceleration time constant before interpolation," "acceleration/deceleration time constant after interpolation," and "acceleration change time of bell-shaped acceleration/deceleration before interpolation."

For example, the parameter "corner speed difference" is used when a corner is to be machined. Specifically, when the NC machine tool 1 machines a corner, the controller of the NC machine tool 1 automatically determines the machining feed rate in accordance with the set value of the parameter "corner speed difference." When the set value of the parameter "corner speed difference" is increased, machining accuracy deteriorates even though the time required to complete the machining of the corner is decreased. In addition, the table and other components of the NC machine tool 1 generate mechanical vibrations, which worsen the accuracy of the machined surface.

When the control parameters, such as "corner speed difference," "allowable acceleration," "acceleration/deceleration time constant before interpolation," "acceleration/deceleration time constant after interpolation," and "acceleration change time of bell-shaped acceleration/deceleration before interpolation," are set to predetermined respective values, the above-described corner accuracy, curve accuracy, machining accuracy, machining shape, machining time, etc., are determined accordingly.

As shown in FIG. 2, the machine mode graph is displayed on a coordinate system having U and V axes which represent different machining conditions. Specifically, the U-axis represents machining accuracy of a curved portion of the workpiece W. The machining accuracy increases toward the direction of an arrow, and feed rate increases toward the direction opposite that of the arrow. The V-axis represents the machining accuracy of a corner portion of the workpiece W. The machining accuracy (sharpness) increases toward the direction of an arrow.

Further, the U-axis and V axis of the machining mode graph shown in FIG. 2 correspond to the memory address of the control-parameter database stored in the storage unit 11 (see FIG. 8). That is, through designation of coordinates of the machining mode graph, a set of control parameters stored at a corresponding memory address of the storage unit 11 is read out.

In the present embodiment, as shown in FIG. 8, for each of machining steps (rough machining step, intermediate-finish machining step, finish machining step A, finish machining step B, and finish machining step C), a set of control parameters corresponding to each of machining modes is stored in the storage unit 11.

Next, the seven machining modes ① to ⑦ shown in FIG. 2 will be described with reference to FIGS. 3 and 4. In the present embodiment, the workpiece W has a machining shape as shown in FIG. 1. That is, a periphery of the workpiece W which extends from the end point w1 to the end point w2 and which has four work portions A to D of different shapes is subjected to contour machining. In FIG. 3, a two-dot chain line represents a reference line; a dotted line represents a path commanded by the machining program; and a solid line represents an actual path followed during machining in each of the machining modes ① to ③. In FIG. 4, a dotted line represents a path commanded by the machining program; and a solid line represents an actual path followed during machining in each of the machining modes ④ to ⑦.

At the work portion A, contour machining is performed in such a manner that the tool 10 enters far into the interior of the workpiece W from point a1 on the reference line, while depicting a curved locus; makes a turn with a small radius of curvature; and returns to point a2 on the reference line.

At the work portion B, contour machining is performed in such a manner that the tool 10 gradually enters the interior of the workpiece W from point b1 on the reference line, while depicting a curved locus of a large radius of curvature; and returns to point b2 on the reference line.

At the work portion C, contour machining is performed in such a manner that the tool 10 enters the interior of the workpiece W from point c1 on the reference line, while depicting a straight locus; makes a turn at an acute angle; and returns to point c2 on the reference line, while depicting a straight locus.

At the work portion D, contour machining is performed in such a manner that the tool 10 enters the interior of the workpiece W at an obtuse angle, from point d1 on the reference line, while depicting a straight locus, and reaches the end point w2.

That is, the maximum change rate of machining shape is high at the work portions A and C, and is low at the work portions B and D.

FIGS. 3 and 4 shows an actual path of the tool 10 for the case in which a set of control parameters corresponding to each of the machining modes ① to ⑦ is set and the tool 10 is subsequently moved along a command path (target path) set in the machining program.

In the present embodiment, the machining mode ④ is positioned at the center of the machining mode graph. The machining mode ④ is a standard mode which is used in cases in which high machining accuracy or high profile accuracy is not required at a work portion which has a high maximum shape change rate. In the machining mode ④, control parameters used for controlling operations of the X-axis and Y-axis servomotors are set to substantially center values within the respective setting ranges for the control parameters. In other words, in the machining mode ④ (standard mode), the control parameters are set to values such that the tool can be moved along a command path (target path) for a curved or corner portion by use of about a half of the machining performance of the NC machine tool 1. The machining mode ④ is not suitable for contour machining of a curved or corner portion, such as the work portions A and C, at which the shape changes drastically, for the following reason. Since the table 8 is moved to follow the contour whose shape changes drastically, the X-axis and Y-axis servomotors must be accelerated or decelerated drastically. As a result, the table 8 produces mechanical vibration, resulting in production of an error in the machined shape.

When the machining mode ① is used, machining accuracy decreases at all the work portions A, B, C, and D. However, since the machining speed increases as compared with the case in which contour machining is performed in the machining mode ④ (standard mode), the machining time becomes shorter. Accordingly, the machining mode ① is suitable for cases in which shortening the machining time is demanded, but higher machining accuracy and profile accuracy than provided in the machining mode ④ are not demanded for a curved or corner portion, such as the work portion A or C, at which the shape changes drastically. This is because mechanical vibration is produced during machining, for the same reason as that mentioned in relation to the machining mode ④.

When a contour, such as the work portion B or D, whose shape changes mildly is machined in the machining mode ①, although produced mechanical vibration is small, the machining accuracy and the profile accuracy become worse as compared with the machining mode ④ (standard mode), and a smooth machining locus is proved at shape change points b1, b2, and d1.

The machining mode ① is a mode in which importance is placed on machining time.

When a curved portion, such as the work portion A or B, is machined in the machining mode ②, the curved portion is machined at the same machining and profile accuracy as in the case where the curved portion is machined in the machining mode ④. Accordingly, the machining mode ② is suitable for cases in which higher machining accuracy and profile accuracy than provided in the machining mode ④ are not demanded for a corner portion, such as the work portion C, at which the shape changes drastically, but shortening of the time required for machining the corner portion is demanded.

When a portion, such as the work portion D, whose shape changes mildly is machined in the machining mode ②, although produced mechanical vibration is small, the machining accuracy and the profile accuracy become worse as compared with the machining mode ④, and a smooth machining locus is proved at a shape change point d1.

The machining mode ② is a mode in which importance is placed on time required for machining a corner portion.

When the machining mode ③ is used, machining accuracy decreases at each work portion. However, since the machining speed increases as compared with the case in which contour machining is performed in the machining mode ④, the machining time becomes shorter. Accordingly, the machining mode ③ is suitable for cases in which higher machining accuracy and profile accuracy than provided in the machining mode ④ are not demanded for a curved portion, such as the work portion A, at which the shape changes drastically, but shortening the time required for machining the curved portion is demanded. This is because mechanical vibration is produced during machining, for the same reason as that mentioned in relation to the machining mode ④. When a corner portion, such as the work portion C or D, is machined in the machining mode ③, the corner portion is machined at the same machining and profile accuracy as in the case where the corner portion is machined in the machining mode ④. When a curved portion, such as the work portion B, whose shape changes mildly is machined in the machining mode ③, although produced mechanical vibration is small, the machining accuracy and the profile accuracy become worse as compared with the machining mode ④, and a smooth machining locus is proved at shape change points b1 and b2.

The machining mode ③ is a mode in which importance is placed on time required for machining a curved shape.

The machining mode ⑤ is suitable for cases in which higher machining accuracy and profile accuracy are demanded for a curved portion, such as the work portion A or B. When a curved portion, such as the work portion A or B, is machined in the machining mode ⑤, machining is not affected by mechanical vibration. Therefore, the machining accuracy and the profile accuracy are improved as compared with the machining mode ④ (standard mode), although the machining time increases.

When a corner portion, such as the work portion C or D, is machined in the machining mode ⑤, the corner portion is machined at the same machining and profile accuracy as in the case where the corner portion is machined in the machining mode ④ (standard mode).

The machining mode ⑤ is a mode in which importance is placed on accuracy of a curved shape.

The machining mode ⑥ is suitable for cases in which higher machining accuracy and profile accuracy are demanded for a corner portion, such as the work portion C or D. When a corner portion, such as the work portion C or D, is machined in the machining mode ⑥, machining is not affected by mechanical vibration. Therefore, the machining accuracy and the profile accuracy are improved as compared with the machining mode ④ (standard mode), although the machining time increases.

When a curved portion, such as the work portion A or B, is machined in the machining mode ⑥, the curved portion is machined at the same machining and profile accuracy as in the case where the curved portion is machined in the machining mode ④ (standard mode).

The machining mode ⑥ is a mode in which importance is placed on accuracy of a corner shape.

The machining mode ⑦ is suitable for cases in which higher machining accuracy and profile accuracy are demanded for all contour shapes, such as the work portions A, B, C, and D. When the work portions A, B, C, and D are machined in the machining mode ⑦, machining is not affected by mechanical vibration. Therefore, the machining accuracy and the profile accuracy are improved as compared with the machining mode ④ (standard mode), although the machining time increases.

The machining mode ⑦ is a mode in which importance is placed on accuracy.

Next, a method for setting control parameters according to a selected machining mode will be described.

In the present embodiment, as shown in FIG. 8, for each of machining steps (e.g., rough machining step, intermediate-finish machining step, finish machining step A, finish machining step B, and finish machining step C), a set of control parameters is stored in a memory area of the storage unit 11, the memory area starting from a memory address corresponding to each machining mode.

The following two methods can be used to set control parameters according to a selected machining mode.

In the first method, machining mode information indicating a machining mode is inserted into a machining program when the machining program is created; and when the machining program is executed, machining is performed through use of a set of control parameters corresponding to the machining mode represented by the machining mode information inserted to the machining program (user setting).

FIG. 6 shows an example of such a machining program. The machining program shown in FIG. 6 consists of machining programs for respective machining steps (rough machining step program, intermediate-finish machining step program, and finish machining step program); and machining command information is inserted into each of the machining programs for respective machining steps.

In the example shown in FIG. 6, the machining command information consists of a command code representing a machining step ("G100" for the rough machining step, "G101" for the intermediate-finish machining step, "G102" for the finish machining step program, etc.), and a symbol ("A," "B," "C," "D," etc.) subsequent to the command code.

When the first method is used, machining mode information is set as machining command information. For example, as the symbol ("A," "B," etc.) subsequent to the command code, there are inserted the coordinates of a selected one of the machining modes ① to ⑦ on the machining mode graph shown in FIG. 2, a memory address of the storage unit 11 at which a set of control parameters corresponding to a selected one of the machining modes ① to ⑦ is stored, or the number of a selected one of the machining modes ① to ⑦. For example, when "G100 (U1, V2)" is set as machining command information, machining is to be performed while a set of control parameters stored at a machining mode address (U1, V2) (the machining mode ③ of the rough machining step) is used. Notably, when the coordinates of a selected machining mode of each machining step or the number of a selected machining mode of each machining step is used as the symbol, a memory address at which a set of control parameters corresponding to the selected machining mode is stored is determined by use of a table, or any other suitable means, which shows the relationship between the coordinates or number of a selected machining mode of each machining step and a memory address at which a set of control parameters corresponding to the selected machining mode is stored.

The machining mode information may be set commonly among a plurality of machining steps or individually for each machining step, or a plurality pieces of machining mode information may be set in a machining step. In the example shown in FIG. 6, a single piece of machining mode information is set in each of the rough machining step and the intermediate-finish machining step, and two pieces of machining mode information are set in the finish machining step (i.e., control parameters are switched in the middle of the finish machining step).

When the machining program is created, the machining mode graph shown in FIG. 2 is displayed on the display unit in order to facilitate setting of machining mode. Specifically, when a command code ("G100," "G101," etc.) representing a machining step is input, a machining mode graph corresponding to the machining step is displayed on the display unit. Since on the machining mode graph a plurality of machining modes are displayed as a plurality of sets of machining conditions, a machining mode corresponding to desired control characteristics can be selected with ease. Further, since the coordinates of each machining mode are displayed on the machining mode graph, the coordinates of each machining mode can be determined easily. Notably, the control section 4 may be configured in such a manner that when a machining mode on the machining mode graph is designated by use of a pointing device such as a cursor or mouse, or the number of a machining mode is input, the coordinates of the machining mode are automatically set in the machining program as machining command information.

In the second method, a machining mode is selected on, for example, a control-parameter setting screen; machining mode information indicating a selected machining mode is stored in the storage unit; and when the machining program is executed, machining is performed through use of a set of control parameters corresponding to the machining mode represented by the machining mode information stored in the storage unit.

When the second method is used, machining command information, which is composed of a command code ("G100," etc.) and a symbol ("A," etc.) as shown in FIG. 6, represents a memory address of the storage unit at which machining mode information is stored. For example, when "G100 (100)" is set as machining command information, the machining mode information corresponding to the rough machining step (G100) is stored at a memory address "100."

Subsequently, machining mode information for each machining step is stored in a memory address corresponding to the machining step.

For example, a control-parameter setting screen 21 shown in FIG. 7 is first displayed on the display unit, and then a worker selects a machining step on the control-parameter setting screen 21. Specifically, the worker selects one of "rough machining," "intermediate-finish machining," "finish machining A," "finish machining B," and "finish machining C" displayed at an operation section 20 of the control-parameter setting screen 21. In response thereto, a machining mode graph (see FIG. 8) corresponding to a selected machining step is displayed on the display unit. Notably, three finish machining steps; i.e., "finish machining A," "finish machining B," and "finish machining C," are provided in order to cope with cases in which changing of control parameters during a finish machining step is desired.

Subsequently, in a state in which a machining mode graph corresponding to a selected machining step is displayed, the worker selects a desired machining mode. For example, the worker selects a desired machining mode by pointing a portion of a screen corresponding to the desired machining mode by use of a pointing device such as a cursor or mouse, or inputs the number or coordinates of a machining mode. Thus, machining mode information of the selected machining mode (i.e., the coordinates of a selected one of the machining modes ① to ⑦ on the machining mode graph, a memory address of the storage unit 11 at which a set of control parameters corresponding to a selected one of the machining modes ① to ⑦ is stored, or the number of a selected one of the machining modes ① to ⑦ is stored at a memory address corresponding to a selected machining step (i.e., an address of the storage unit at which machining mode information corresponding to the selected machining step is to be stored).

For example, when the machining mode ③ is selected in a state in which a machining mode graph corresponding to the rough machining step is displayed, machining mode information corresponding to the selected machining mode ③ (e.g., the coordinates (U1, V2) of the machining mode ③) is stored in a memory address corresponding to the rough machining step (e.g., address "100" of the storage unit at which machining mode information corresponding to the rough machining step is to be stored).

For the remaining machining steps, machining mode information corresponding to a selected machining mode is stored in a memory address corresponding to each machining step (at which a machining mode of each machining step is to be stored) in a manner similar to that described above.

Next, the operation of the control section 4 for machining the workpiece W in accordance with the machining program shown in FIG. 6 will be described with reference to the flowchart shown in FIG. 5. The processing shown in FIG. 5 is started when the worker instructs start of machining after having set machining mode information for each of the machining steps; i.e., rough machining step, intermediate-finish machining step, finish machining step A, finish machining step B, and finish machining step C, in the above-described method.

In step S1, the control section 4 reads out one block of the machining program.

In subsequent step S2, the control section 4 judges whether control parameters are to be switched. Specifically, the control section 4 judges whether the block read out in step S1 contains a command code relating to machining mode ("G100" for rough machining, "G101" for intermediate-finish machining, etc.). When the block contains a command code relating to machining mode, the control section 4 proceeds to step S3. When the block does not contain a command code relating to machining mode, the control section 4 proceeds to step S6.

In step S3, the control section 4 judges whether the machining mode has been set by means of user setting; i.e., the machining mode has been designated directly. The judgment as to whether the machining mode has been set by means of user setting is made through judgment as to whether the machining command information composed of a command code ("G100," etc.) and a symbol ("A," etc.) subsequent thereto includes machining mode information.

When the machining mode has been set by means of user setting, the control section 4 proceeds to step S4. In step S4, the control section 4 obtains a designated machining mode (e.g., coordinates of the designated machining mode) from the machining mode information (user set value) contained in the machining command information.

When the machining mode has not been set by means of user setting, the control section 4 obtains a memory address (e.g., a memory address designated by the symbol) corresponding to the machining step from the machining command information, and then reads out the designated machining mode (e.g., coordinates of the designated machining mode) from the memory address.

In subsequent step S5, the control section 5 reads out a set of control parameters from the memory address of the storage unit 11 corresponding to the designated machining mode (e.g., coordinates of the designated machining mode). The memory address used for read-out operation is switched for each machining step by means of the command code for designating a machining step. For example, when a command code for the rough machining step is contained, a set of control parameters is retrieved from a memory address provided for the rough machining step. Similarly, when a command code for the intermediate-finish machining step is contained, a set of control parameters is retrieved from a memory address provided for the intermediate-finish machining step.

Once a certain machining mode is designated, the machining operation of the NC machine tool 1 is controlled by use of control parameters for the certain machining mode until a different machining mode is designated or a command code for resetting machining mode is executed. Notably, when the command code for resetting machining mode is executed, the machining mode is switched to the standard mode (in the present embodiment, the machining mode ④).

In step S6, the control section 4 executes commands, other than the control-parameter switching command, which are contained in the block read out in step S1.

In step S7, the control section 4 judges whether the machining program has ended. When the machining program has not ended, the control section 4 returns to step S1 and reads the next block. When the machining program has ended, the control section 4 ends the processing.

As described above, in the control-parameter setting apparatus according to the present embodiment, the worker is required to set a machining mode only, and is not required to directly set values of control parameters. Therefore, values of control parameters for obtaining desired control characteristics can be set with ease.

The present invention is not limited to the above-described embodiment, and may be modified within the scope of the present invention.

The embodiment has been described with reference to the case in which the workpiece W is contoured by the NC machine tool 1 equipped with the CNC having three numeral control axes (NC axes). However, no limitation is imposed on the structure, the number of control axes, layout, operation, or control of the NC machine tool 1, and no limitation is imposed on the machining shape of the workpiece W. Therefore, they may be modified freely.

The machining mode graph displayed on the display unit 6 is not limited to that shown in FIG. 2, and may be modified in various manners, insofar as the machining mode graph enables the worker to easily distinguish the differences among machining modes used in the NC machine tool 1, by watching the display unit 6.

Although in the embodiment seven machining modes are provided, the number of machining modes may be changed freely.

In the embodiment, a plurality of machining modes are displayed in the form of a machining mode graph while two-dimensional coordinate axes are used. However, the method of displaying the machining modes may be modified in various manners. For example, a single-dimension coordinate axis; i.e., only a horizontal axis, is provided; and grades (e.g., "poor," "average," "good") regarding "profile accuracy" are arranged along the axis. Alternatively, a single-dimension coordinate axis; i.e., only a horizontal axis, is provided; one end of the horizontal axis is labeled "Short machining time," and the other end of the horizontal axis is labeled "Higher machining accuracy"; and a plurality of machining modes grades are arranged between the two ends.

In the embodiment, a machining mode is set by means of designating machining accuracy and machining shape of the workpiece W. However, the method of machining mode setting may be modified freely.

In the embodiment, machining command information consists of a command code and a symbol. However, the form of the machining command information is not limited thereto.

The method of setting a memory address (an address of the storage unit at which machining mode information corresponding to a machining step is to be stored) corresponding to a machining step and machining mode information (e.g., the coordinates of a selected one of the machining modes ① to ⑦ on the machining mode graph, a memory address of the storage unit 11 at which a set of control parameters corresponding to a selected one of the machining modes ① to ⑦ is stored, or the number of a selected one of the machining modes ① to ⑦).

In the machining mode graph, accuracy increases along the U axis toward the direction of the arrow, and degree of sharpness increases along the V axis toward the direction of the arrow. However, this may be modified in various manners.

In the embodiments, different machining modes are provided in order to machine curved portions and corner portions at different conditions. However, the shapes of portions to be machined are not limited thereto and may be changed.

The details of the flowchart shown in FIG. 5 may be modified in various manners.

In the embodiment, the worker sets a machining mode by use of the display unit 6 provided at the operation section 3 of the NC machine tool 1. However, such setting may be performed through remote operation at a centralized operation section or through operation of a programming unit for preparing a machining program.

The control parameters of the NC machine tool 1 are not limited to those described above; and other control parameters, such as servo gain, acceleration/deceleration time constant, and acceleration, may be used.

The present invention can be used to set control parameters of a controller for an apparatus other than NC machine tools.

As described above, the apparatus for setting control parameters of a machining apparatus according to the present invention enables a worker to set control parameters by designating a machining mode without directly setting the control parameters. Therefore, even when the worker is not an experienced worker, he or she can set easily control parameters necessary for obtaining desired control characteristics (e.g., control characteristics for shortening machining time, and control characteristics for realizing high machining accuracy), and thus can operate the machining apparatus efficiently.

What is claimed is:

1. An apparatus for setting control parameters of a machining apparatus, comprising:

a storage unit configured to store a set of control parameters for each of a plurality of machining modes;

an input device configured to select one of the plurality of machining modes; and a control unit configured to select a set of control parameters corresponding to the selected machining mode and to set the set of control parameters as control parameters to be used for controlling the machining apparatus, wherein the control unit retrieves the set of control parameters from the storage unit according to a command code and a memory location corresponding to the selected machining mode.

2. An apparatus for setting control parameters according to claim 1, wherein the apparatus includes a display unit;

the control unit displays the plurality of machining modes on the display unit; and when one of the plurality of machining modes displayed on the display unit is selected by use of the input device, the control unit selects a set of control parameters corresponding to the selected machining mode and sets the set of control parameters as control parameters to be used for controlling the machining apparatus.

3. An apparatus for setting control parameters according to claim 2, wherein the plurality of machining modes are classified in accordance with machining accuracy.

4. An apparatus for setting control parameters according to claim 2, wherein the plurality of machining modes are classified in accordance with machining time.

5. An apparatus for setting control parameters according to claim 2, wherein the plurality of machining modes are classified in accordance with machining accuracy and machining time.

6. An apparatus for setting control parameters according to claim 2, wherein the plurality of machining modes are classified in accordance with a corner accuracy and a curve accuracy of a workpiece.

7. An apparatus for setting control parameters according to claim 2, wherein the plurality of machining modes are displayed on the display unit in the form of a graph.

8. A method for setting control parameters of a machining apparatus, comprising:

storing in a storing unit a set of control parameters for each of a plurality of machining modes;

designating one of the plurality of machining modes; and selecting a set of control parameters corresponding to the designated machining mode and setting the set of control parameters as control parameters to be used for controlling the machining apparatus, wherein selecting the set of control parameters retrieves the set of control parameters from the storage unit according to a command code and a memory location corresponding to the selected machining mode.

9. A method for setting control parameters according to claim 8, further comprising inserting machining mode information in a machining program so as to designate one of the plurality of machining modes.

* * * * *